(12) United States Patent
Wang et al.

(10) Patent No.: US 7,932,498 B2
(45) Date of Patent: Apr. 26, 2011

(54) METHOD FOR GENERATION OF SPECT TRAJECTORY DATA FROM CT DATA

(75) Inventors: Sharon Xiaorong Wang, Hoffman Estates, IL (US); John Thomas Pawlak, Villa Park, IL (US); Govind Pai, Aurora, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 388 days.

(21) Appl. No.: 12/240,818

(22) Filed: Sep. 29, 2008

(65) Prior Publication Data
US 2009/0141852 A1    Jun. 4, 2009

Related U.S. Application Data

(60) Provisional application No. 60/995,721, filed on Sep. 28, 2007.

(51) Int. Cl.
*G01T 1/166* (2006.01)
(52) U.S. Cl. .............. 250/363.04; 250/361 R; 250/362; 250/363.02
(58) Field of Classification Search . 250/361 R–363.01; 378/4, 12, 98.6, 146; 382/131
See application file for complete search history.

(56) References Cited

U.S. PATENT DOCUMENTS

| | | | | |
|---|---|---|---|---|
| 5,463,721 | A * | 10/1995 | Tam | 345/427 |
| 7,417,232 | B2 * | 8/2008 | Wang et al. | 250/363.09 |
| 7,444,011 | B2 * | 10/2008 | Pan et al. | 382/131 |
| 2007/0036418 | A1 * | 2/2007 | Pan et al. | 382/131 |
| 2007/0069138 | A1 * | 3/2007 | Wang | 250/363.04 |

* cited by examiner

*Primary Examiner* — David P Porta
*Assistant Examiner* — Casey Bryant
(74) *Attorney, Agent, or Firm* — Peter L. Kendall

(57) ABSTRACT

A method for optimizing the scanning trajectory of a radiation detector device, e.g., a SPECT scanning device, about an object generally includes: obtaining object image data using a different imaging modality, e.g., a CT scanning device, determining a maximum object boundary based on the image data, calculating an optimal scan trajectory of the SPECT scanning device relative to the object based on the maximum object boundary, scanning the object with the SPECT scanning device along the optimal scan trajectory to detect gamma photons emanating from the object, from which an image can be reconstructed from the detected gamma photons. Preferably, the SPECT device includes at least two detectors arranged at a pre-selected angle relative to one another and the optimal scan trajectory minimizes the distance between the detectors and the object while maximizing the geometric efficiency of the detectors relative to the object.

18 Claims, 7 Drawing Sheets

METHOD FOR GENERATION OF SPECT TRAJECTORY DATA FROM CT DATA

CROSS-REFERENCE TO RELATED APPLICATIONS

This application claims benefit of under 35 U.S.C. §119 of U.S. Provisional Pat. App. No. 60/995,721, filed Sep. 28, 2007, which application is incorporated herein by reference in its entirety.

FIELD OF THE INVENTION

The present invention generally relates to nuclear medicine, and systems for obtaining nuclear medicine images. More specifically, the present invention relates to a method for optimizing SPECT trajectory data from CT data.

BACKGROUND OF THE INVENTION

Nuclear medicine is a unique medical specialty wherein radiation is used to acquire images which show the function and anatomy of organs, bones or tissues of the body. Radiopharmaceuticals are introduced into the body, either by injection or ingestion, and are attracted to specific organs, bones or tissues of interest. Such radiopharmaceuticals produce gamma photon emissions which emanate from the body and are captured by scintillation crystals with which the photons interact to produce flashes of light or events. In SPECT (Single Photon Emission Computed Tomography), events are detected by one or more collimated gamma photon detectors, which are typically rotated about a patient's body at a number of different view angles to collect projection data from each view angle. Using the projection data that is collected, three-dimensional images of the organs of the body, which have been taken up the radiopharmaceuticals, e.g. the heart, can be reconstructed.

While SPECT is a powerful tool in the clinician's toolbox, it suffers from at least one drawback—SPECT imaging can be time consuming when compared with other types of imaging procedures. For example, whereas CT (Computed Tomography) x-ray scanning procedures can take as little as a minute to complete, SPECT procedures can take more than fifteen minutes to complete. This is problematic because it can result in patient discomfort which can make it difficult for a patient to remain still during scanning procedures, which can ultimately affect image quality. Similarly, some patients may be unwilling to undergo scanning procedures that take long periods of time.

The amount of time that it takes to scan a patient using SPECT is dependent upon a number of factors. Most significantly, however, is the fact that SPECT detectors include collimating devices that only allow gamma photons traveling along precise trajectories to interact with the detectors. As a result, it can take extended time periods for a sufficient number of gamma photons to interact with the detectors to produce an image. Other factors affecting SPECT scanning time include, but are not limited to, the distance between the object being scanned and the detector(s), the amount of tissue between the object and the detector(s), and the number of different angles of orientation of the SPECT detectors with respect to the object being studied needed to acquire a sufficient number of planar image data from which to reconstruct tomographic images. Further factors affecting SPECT scanning time is that, in many cases, the scanning trajectory is often manually determined by measuring the position of the detector(s) relative to the patient. Such manual processes can be cumbersome and can take several minutes to perform. Finally, manually calculated trajectories may not be optimal or geometrically efficient for the particular scan that is to be performed and/or the specific object that is to be scanned, which can further negatively effect scan time and image quality.

What is needed then is a method for optimizing the trajectory of a SPECT detector(s) about an object or patient to be scanned so as to reduce the overall scan time and patient-on-bed time to thereby enhance image quality.

SUMMARY OF THE INVENTION

The present invention broadly comprises a method for acquiring images within a radiation field, preferably using SPECT and CT scanning systems.

In one embodiment, the method includes optimizing the scanning trajectory of a radiation detector device, e.g., a SPECT scanning device, about an object generally by obtaining object image data using a different radiation detecting modality, e.g., a CT scanning device, determining a maximum object boundary based on the image data, calculating an optimal scan trajectory of the SPECT device relative to the object based on the maximum object boundary, scanning the object with the SPECT scanning device along the optimal scan trajectory to detect gamma photons emanating from the object, and preparing an image from the detected gamma photons. Preferably, the SPECT detector device includes at least two detector heads arranged at a pre-selected angle relative to one another and the optimal scan trajectory minimizes the distance between the detector heads and the object while maximizing the geometric efficiency of the detectors relative to the object.

In another embodiment, the method includes filtering image data corresponding to a plurality of images obtained by the CT device, summing the image data corresponding to the plurality of images, and preparing an edge image from the summed image which corresponds to the maximum object boundary of the object.

In an embodiment, the optimal scan trajectory is calculated by describing the sum of the weighted distances from the edge image to an ellipse in a first pass unconstrained optimization of x according to the equation:

$$F(x) = \sum_{i=0}^{n-1} w_i(x)[r(x) - r_i]^2; \quad (6)$$

wherein, $$(\vec{r} - \vec{r}_i) \vec{r}\,' = 0 \, (i=0,1,\ldots,n-1); \quad (3)$$

$$t_i = (\vec{r} - \vec{r}_i) \times \vec{r}\,'; \quad (4)$$

$$w_i \begin{cases} w, & t_i > 0 \\ 1, & t_i \leq 0; \end{cases} \quad (5)$$

$x = (x_0, y_0, a, b)$;

n is the number of data points extracted from the edge image;

the initial value of x is described using a bounding box of the edge image data wherein, $$x_0=(\max(x_i)+\min(x_i))/2, y_0=(\max(y_i)+\min(y_i))/2; \quad (7)$$

$$a=(\max(x_i)-\min(x_i))/2, b=(\max(y_i)-\min(y_i))/2; \text{ and,} \quad (8)$$

F is minimized; and,
describing the sum of the weighted distances from the edge image to an ellipse in a second pass constrained optimization of x according to the equation:

$$F(x) = \sum_{i=0}^{n-1} (r - r_i)^2; \quad (9)$$

wherein, $$t_i \leq 0, (i=0,1,\ldots,n-1); \text{ and,} \quad (10)$$

$$y_i = I_1(x_i), y_i < I_2(x_i); \text{ and} \quad (11)$$

$I_2$ and $I_2$ represent the at least two detectors.

In embodiments of the invention, the first radiation device comprises a SPECT scanning device having at two detector heads disposed at a 90° angle with respect to one another. In some embodiments, the at least two detector heads are disposed at a 180° angle with respect to one another. In other embodiments, the at least two detector heads are disposed at a 76° angle with respect to one another. In other embodiments, the trajectory comprises arcuate portions and/or line portions and/or portions of an ellipse. In still other embodiments, image data obtained from a CT scanning device is converted to filtered image data and the filtered image data is converted into binary image data. In some embodiments, the binary image data is compared with the original image data derived from the CT scanning device.

In some embodiments, the instant methods for optimizing the scanning trajectory of a first radiation detector device can be combined with the systems and methods for reducing nuclear imaging scanning time as described in U.S. Pat. No. 7,408,162, which patent is incorporated herein by reference in its entirety.

BRIEF DESCRIPTION OF THE DRAWINGS

The invention will now be more fully described by way of example with reference to the accompanying drawings in which.

DETAILED DESCRIPTION OF THE INVENTION

The present invention will now be described and disclosed in greater detail. It is to be understood, however, that the disclosed embodiments are merely exemplary of the invention and that the invention may be embodied in various and alternative forms. Therefore, specific structural and/or functional details disclosed herein are not to be interpreted as limiting the scope of the claims, but are merely provided as an example to teach one having ordinary skill in the art to make and use the invention.

As illustrated in FIGS. 1-6, the present invention addresses the above-identified problems by providing a method wherein the optimal scanning trajectory of a SPECT scanning device about an object can be determined by utilizing data provided by a radiation detector of another modality, e.g., a CT scanning device. The image data provided by the CT scanning device can then be used to calculate an optimal scan trajectory for the SPECT scanning device. The object can then be scanned along the trajectory in order to detect emitted gamma photons and an image ultimately reconstructed from the acquired projection data.

Figure 1:
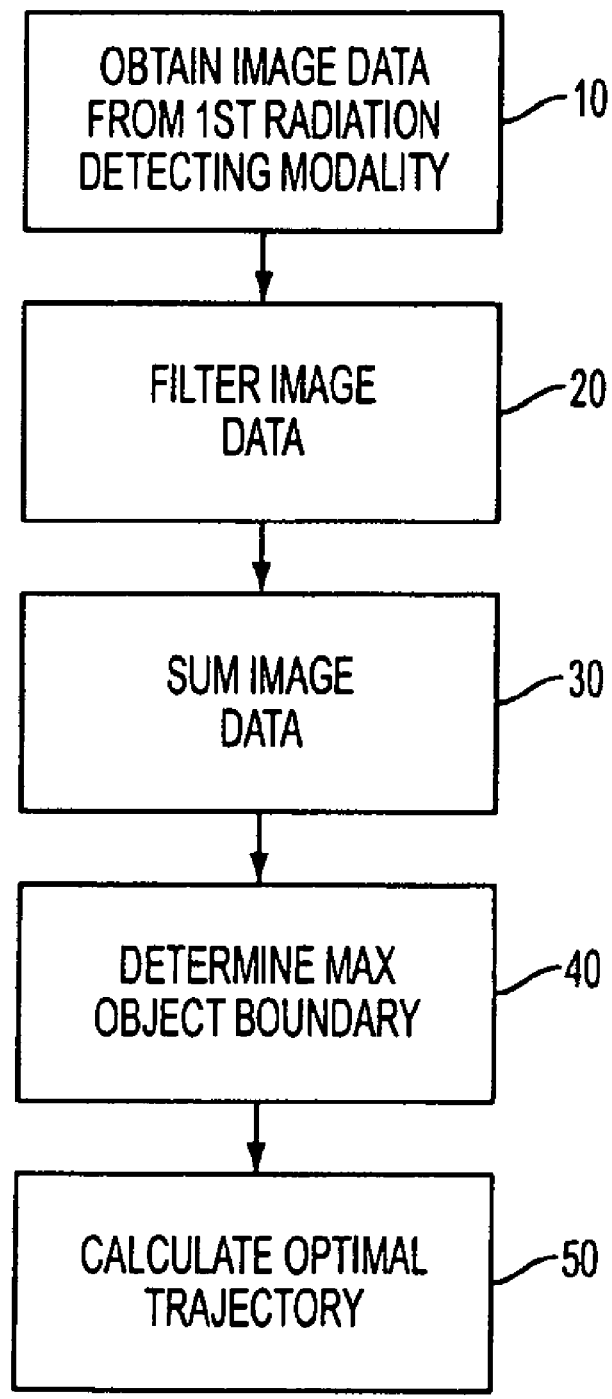
FIG. 1 is a flow diagram illustrating a method according to one embodiment of the invention.

As shown in FIG. 1, the method includes the steps of: obtaining image data of an object using a first radiation detection or imaging modality 10 (e.g. a CT device), filtering the obtained image data 20, preparing a summation of the image data 30 (e.g., converting volume data to a tomographic slice), determining the maximum object boundary of the object based on the summation of the image data 40, and calculating an optimal trajectory based on the maximum object boundary 50. The above steps generally include identifying the image data that is to be considered, smoothing/filtering the image data, converting the image data to provide threshold image data, and applying an OR operator to the threshold image data to convert image data corresponding to a plurality of images, into image data corresponding to a single synthetic image. The single synthetic image comprises a sum of the image data and describes the maximum boundary of the object. Using the single synthetic image, an edge image is then described and an ellipse-line combination is generated, which forms the basis for parameter optimization. The optimized parameters are then used to generate the trajectory of the SPECT scanning device.

Figure 2:
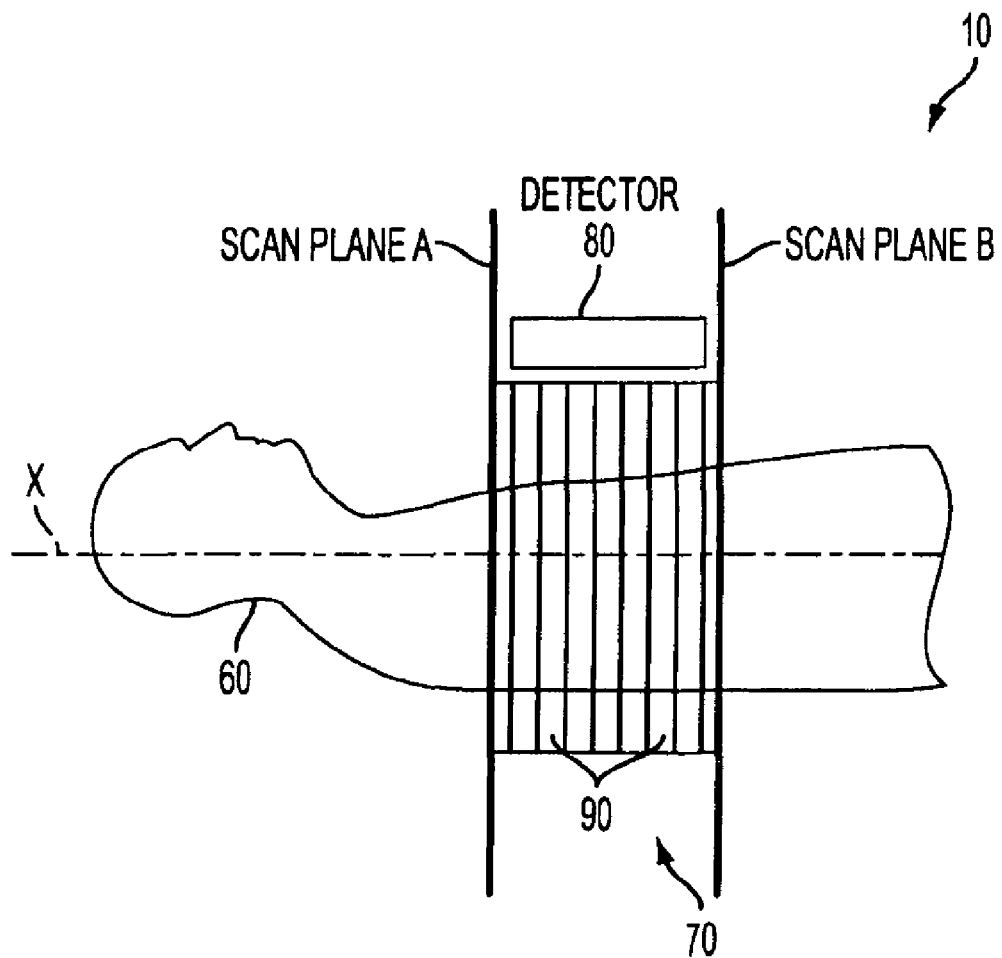
FIG. 2a is an image of an object slice produced using a CT scan.
FIG. 2b is the image shown in FIG. 2a, but which has been filtered and smoothed.
FIG. 2c is the image shown in FIG. 2b, but which has been subjected to threshold detection analysis.
FIG. 2d is the image shown in FIG. 2c, but with image of FIG. 2a overlaid thereon.
Figure 3A:
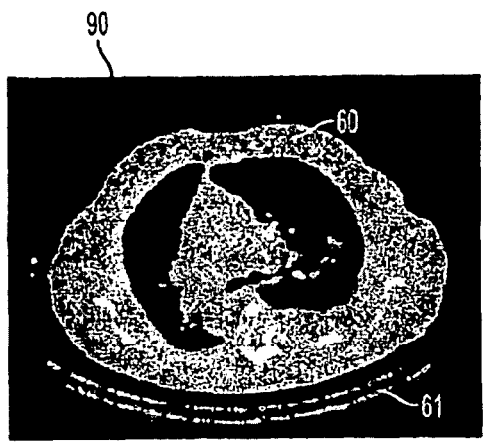
FIG. 3 is a schematic view illustrating that volume of the object selected for purposes of providing an optimal trajectory determination according to the invention.
Figure 3B:
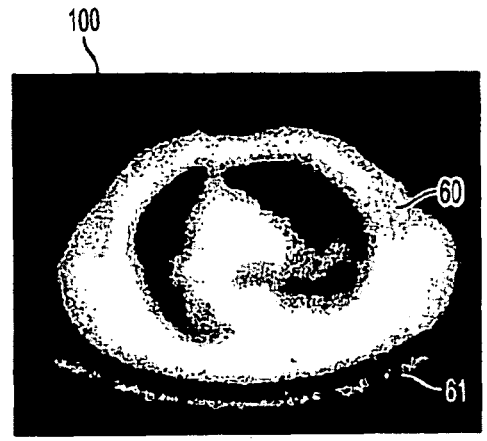
Figure 3C:
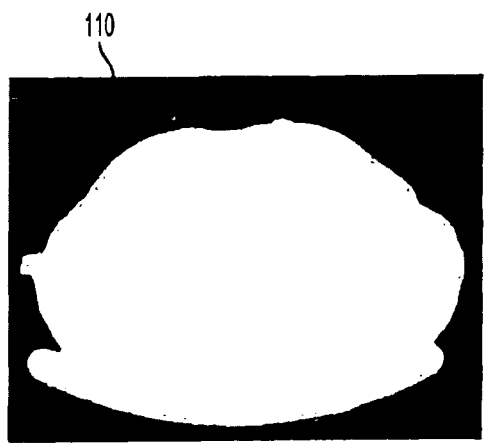
Figure 3D:
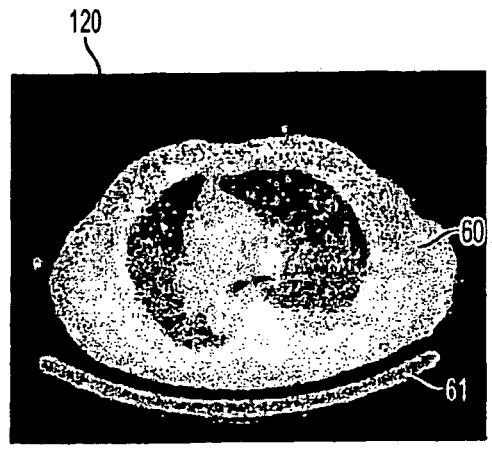

Referring now to FIG. 2, image data derived from a first modality, e.g., a CT scanning device, can be used for determining the optimal scan trajectory of a second imaging modality, e.g., a SPECT scanning device. For example, tomographic image data 70 obtained from a CT scanning device is shown as describing that portion of patient 60 disposed between scan plane A and scan plane B and corresponds with the dimensions of one or more detectors 80 of a SPECT scanning device configured for rotation about the X axis and/or a desired SPECT scan of patient 60 along axis X. Accordingly, as image data 70 describes a number of images or image slices 90 of patient 60 between scan plane A and scan plane B, such image data 70, and/or image slices 90 can be processed and used to describe an optimal SPECT detector trajectory about patient 60 along axis X.

The steps for processing image data 70 are best described, visually, by reference to FIGS. 3-4. It should be appreciated, however, that while FIGS. 3-4 describe the processing of image data 70 relative to an actual image slice 90, the preparation and processing of actual image slices is not necessarily required and is only described herein for purposes of clarity. Additionally, it should be understood that data processing is generally performed relative to a number of image slices 90 defining image data 70. Accordingly as shown in FIGS. 3a and 3b, image data 70 including one or more image slices 90 of an object/patient 60 that is obtained from a CT scanning device can be smoothed/filtered to provide a smoothed/filtered image slice 100. In the embodiment disclosed, the smoothing kernel used to provide smoothed/filtered image slice 100 comprises a 21×21 averaging filter. As shown in FIG. 3c, the smoothed/filtered image 100 can then be transformed into a binary image, which describes a threshold image slice 110. Finally, as shown in FIG. 3d, the image slice 90 can then be overlaid upon, i.e., compared with, the threshold image slice 110 to confirm that the original image slice 90 is encompassed by the threshold image slice 110. This comparison can be performed to ensure that values of the smoothing/filtering steps and the threshold image generation steps are accurate and correspond with one another.

Figures 4A, 4B, 4C:
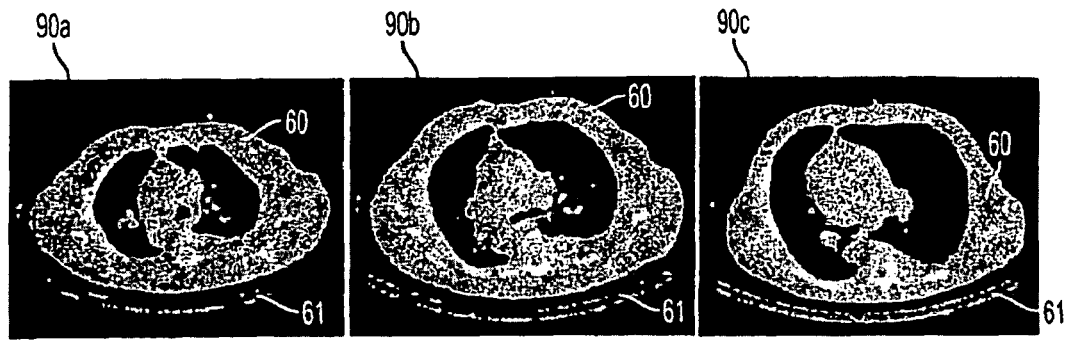
FIGS. 4a-4c are images of object slices taken from the volume described in FIG. 3.
Figures 4D, 4E, 4F:
FIGS. 4d-4f are threshold images of the object slices shown in FIGS. 4a-c.
Figures 4G, 4H, 4I:
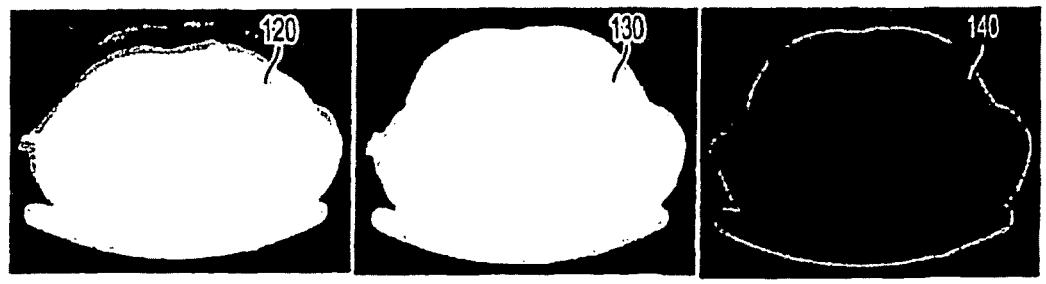
FIG. 4g is a summation of the images shown in FIGS. 4d-4f.
FIG. 4h is an "OR" image of FIG. 4g, which describes the maximum boundaries of the volume of FIG. 3.
FIG. 4i is an illustration of an edge map derived from FIG. 4h.

Referring now to FIGS. 4a-4i, which visually illustrate a process of determining a maximum object boundary, as may be appreciated, image slices 90a, 90b and 90c each differ from one another in that they each describe a different portion of patient 60 along the X-axis between scan plane A and scan plane B of FIG. 2. As shown in FIGS. 4d-4f, from each of image slices 90a, 90b and 90c, respectively, threshold image slices 110a-110c can be prepared. As shown in FIG. 4g, threshold images 110-110c can then be combined with one another to describe summation image 120. As shown in FIG. 4h, summation image 120 can then be used to prepare "OR" image 130, which describes the maximum cross sectional area of patient 60 between scan plane A and scan plane B. Finally, as shown in FIG. 4i, the "OR" image can then be used to prepare edge image 140, which describes the maximum object boundary, e.g., the maximum boundary of patient 60, along the X-axis between scan plane A and scan plane B of FIG. 2.

Figure 5:
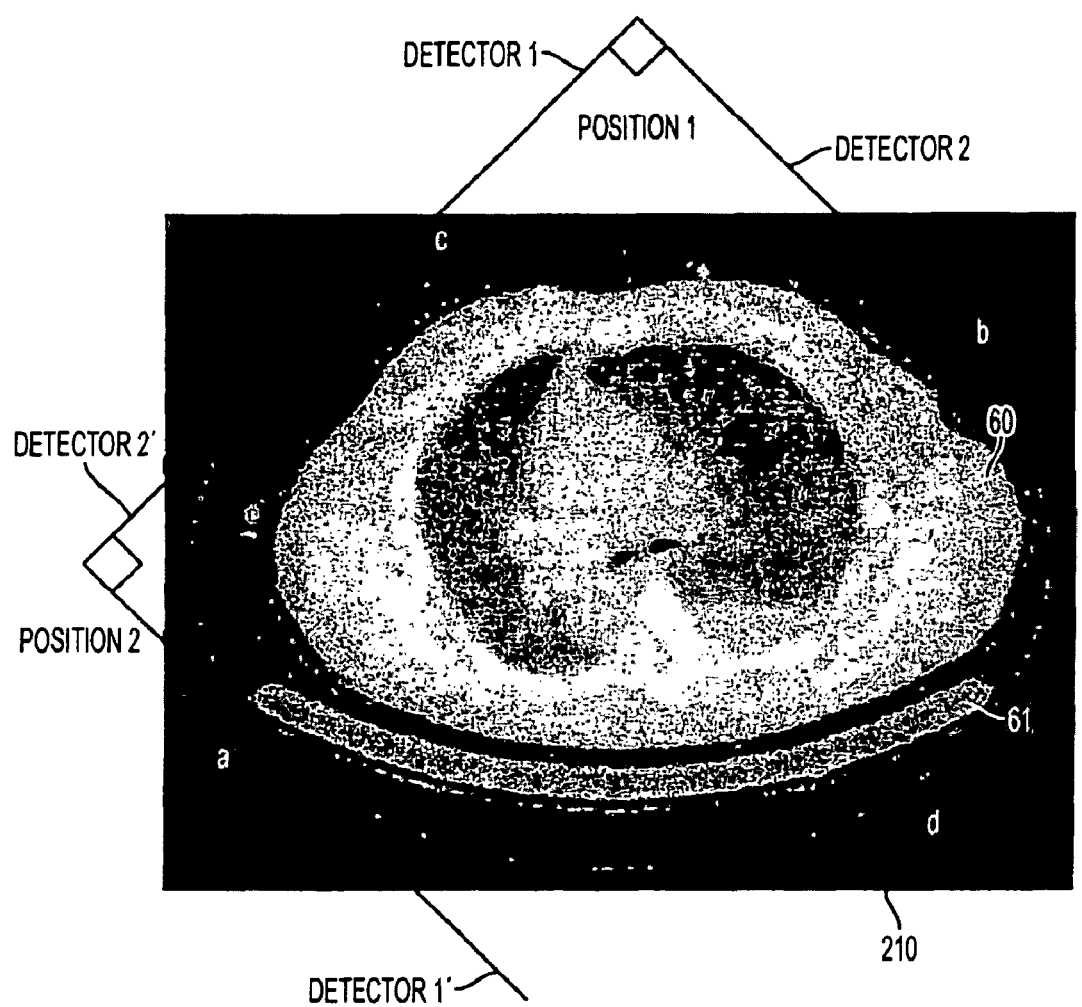
FIG. 5 is a schematic illustration of a detector trajectory boundary and range considerations.

Reference is now made to FIG. 5, which illustrates boundary and interference range considerations for SPECT detector trajectories about a portion of patient 60 and bed 61. It should be understood that while FIG. 5 describes a pair of detectors disposed at 90° relative to one another, the inventive methods can be applied to systems comprising any number of detectors and to systems comprising detectors disposed at angles other than 90° relative to one another, e.g., 76°, 180°, etc. Additionally, it should also be understood that at position 1, while detectors 1 and 2 are illustrated as being disposed at +/−45° angles relative to patient 60 (relative to longitudinal axis X of FIG. 2), according to the inventive methods, the start angles of the detectors can vary or be further optimized as described in U.S. Pat. No. 7,408,162. Notwithstanding, at position 1, detector 1 is illustrated as being disposed at a 45° angle with respect to the X-axis, whereas at position 2, detector 1 is illustrated as being disposed at an angle of 135° with respect to the X-axis. As detector 1 and detector 2 are passed along arc ACB of ellipse 210, from position 1 to position 2, it is seen that they do not interfere with patient 60 or bed 61 along arc ADB in any manner. As a result, arc ADB is generally irrelevant for purposes of trajectory optimization and, in many instances, the data relative thereto can be discarded. Consequently, fewer angles are required to be considered during the trajectory optimization process, which reduces calculation error and allows a more efficient trajectory to be determined, e.g., a more efficient trajectory can allow the detectors to be arranged closer to the patient thereby increasing geometric efficiency.

Figure 6:
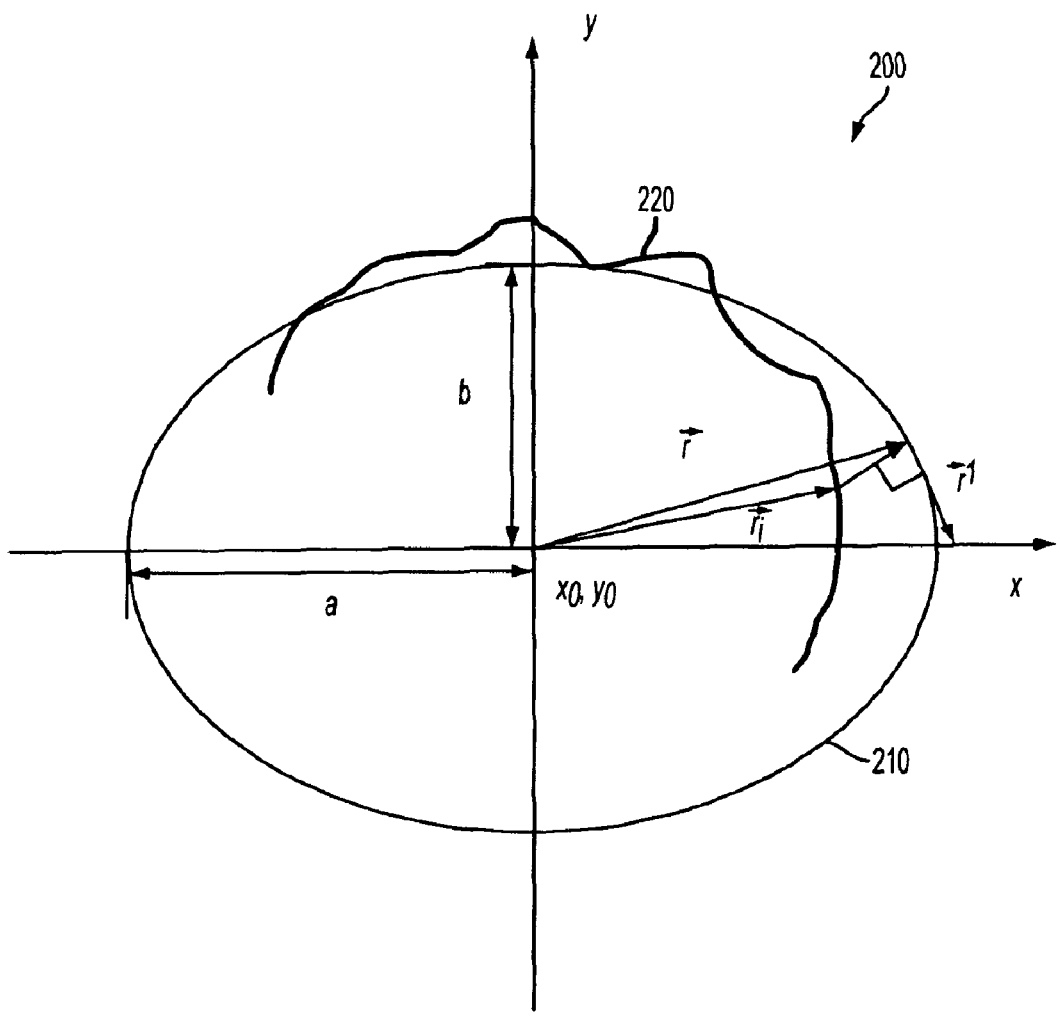
FIG. 6 is a schematic illustration of a coordinate system for purposes of determining an optimal detector trajectory; and, FIG. 7 is a schematic illustration of an optimized detector trajectory for the volume described in FIG. 3.
Figure 7:
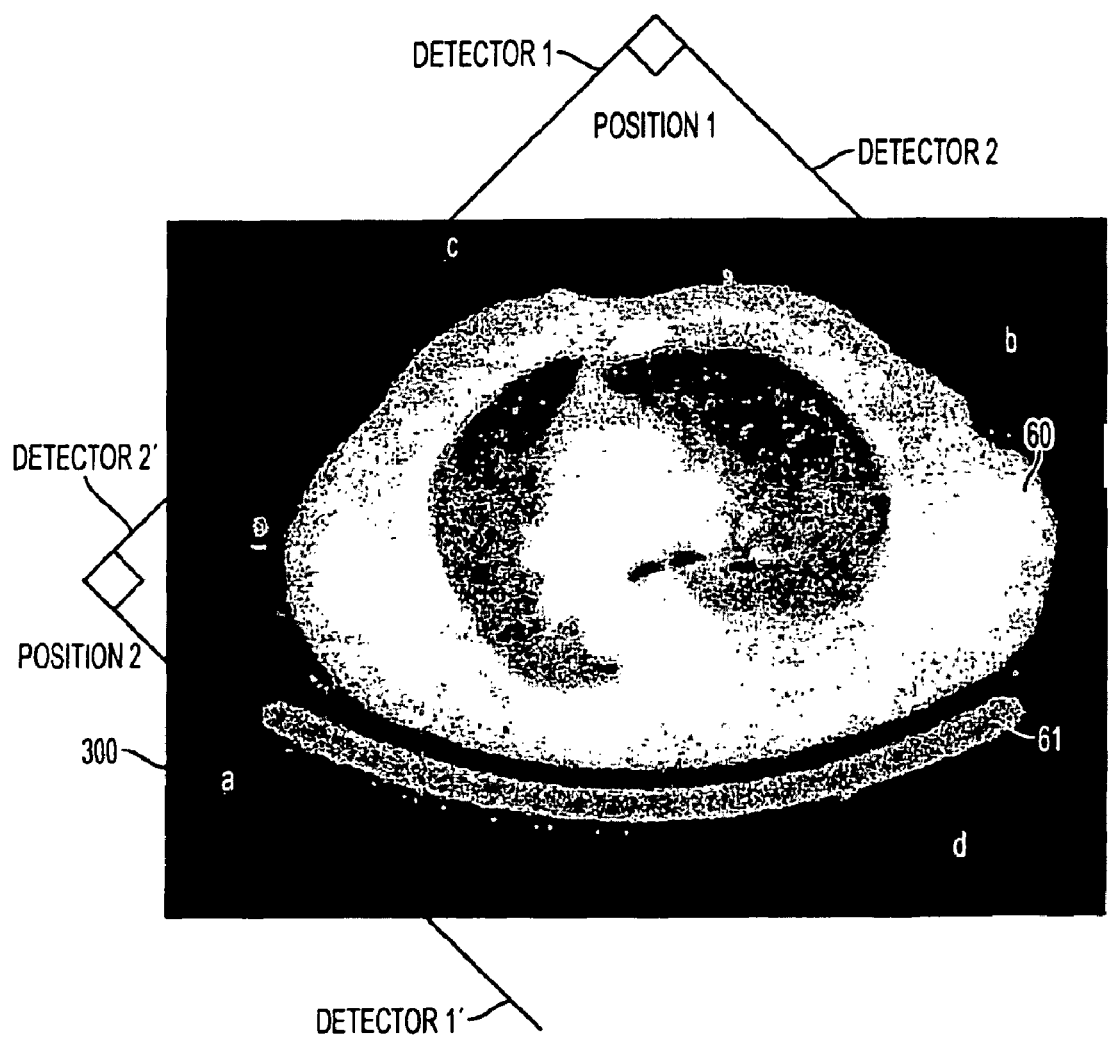

Referring now to FIGS. 6 and 7, wherein FIG. 6 illustrates a rectangular coordinate system 200 including ellipse 210 and a maximum object boundary 220, the process for determining an optimal detector trajectory can be formulated as a minimization problem. That is, where the center of ellipse 210 is described by $(x_0, y_0)$, the major (longer) axis as a and the minor (shorter) axis as b, the ellipse, $\vec{r}=(x, y)$, can be expressed as:

$$\begin{cases} x = a\cos\theta - x_0 \\ y = b\sin\theta - y_0; \end{cases} \quad (1)$$

and the tangent vector of the ellipse, $\vec{r}'=(x', y')$, can be expressed as:

$$\begin{cases} x' = a\sin\theta \\ y' = b\cos\theta; \end{cases} \quad (2)$$

and the distance from a point on the maximum object boundary 220 to ellipse 210 can be described as the perpendicular distance to the tangent line of the ellipse and is determinable by:

$$(\vec{r}-\vec{r}_i)\vec{r}'=0 (i=0,1,\ldots,n-1); \quad (3)$$

substituting equation (1) and equation (2) into equation (3) provides an equation in terms of ellipse parameter θ, which is a quadratic equation having two roots wherein the root that minimizes $|\vec{r}|$ is the solution. Where t defines the cross product:

$$t_i=(\vec{r}-\vec{r}_i)\times\vec{r}'; \quad (4)$$

then, a weighting function can be defined as:

$$w_i = \begin{cases} w, & t_i > 0 \\ 1, & t_i \leq 0; \end{cases} \quad (5)$$

where w is a positive number. The weighting function serves to penalize those points of the maximum object boundary 220 falling outside the ellipse 210. The objective function can be described by:

$$F(x) = \sum_{i=0}^{n-1} w_i(x)[r(x) - r_i]^2; \quad (6)$$

where $x=(x_0, y_0, a, b)$, and n is the number of data points extracted from edge image 140 data. The initial value of x can be determined using a bounding box of the edge image data set, that is, $$x_0=(\max(x_i)+\min(x_i))/2, y_0=(\max(y_i)+\min(y_i))/2; \text{ and,} \quad (7)$$

$$a=(\max(x_i)-\min(x_i))/2, b=(\max(y_i)-\min(y_i))/2. \quad (8)$$

Minimizing F provides the first pass of x. Because the first pass optimization is unconstrained, there is the possibility that data points of edge image 140 (see FIG. 4*i*) can fall outside the ellipse. To prevent such occurrence, a second pass constrained optimization can be used wherein the objective function is:

$$F(x) = \sum_{i=0}^{n-1} (r - r_i)^2; \quad (9)$$

and the constraints are:

$$t_i \leq 0, (i=0,1,\ldots,n-1); \text{ and,} \quad (10)$$

$$y_i = I_1(x_i), y_i < I_2(x_i). \quad (11)$$

The geometrical relevance of equations (10) and (11) is that data points of edge image 140 all fall within the ellipse (and outside of the maximum object boundary) and that the data points are bound by detector 2 (at position 1) and detector 1 (at position 2) of FIG. 5, respectively. Such two-pass approach can reduce overall computation time. As may be appreciated, the above methods may be input into a SPECT computer system for automatic calculation.

Finally, as shown in FIG. 7, upon application of the inventive methods, it is seen that an optimal SPECT scanning trajectory 300 for detectors 1 and 2, can be described from existing object image data without the need for manual determination.

It should be appreciated by those having ordinary skill in the art that while the present invention has been illustrated and described in what is deemed to be the preferred embodiments, various changes and modifications may be made to the invention without departing from the spirit and scope of the invention. Therefore, it should be understood that the present invention is not limited to the particular embodiments disclosed herein.

What is claimed is:

1. A method of optimizing a scanning trajectory of a first radiation detector device about an object to be scanned, comprising:
    obtaining image data corresponding to a plurality of images of the object using a second radiation detector device of a different imaging modality;
    determining a maximum object boundary based on the image data;
    calculating an optimal scan trajectory of said first radiation detector device relative to the object based on the maximum object boundary, where the optimal scan trajectory minimizes a distance between the first radiation detector and the object; and
    scanning the object with the first radiation detector device along the optimal scan trajectory so as to detect radiation photons emanating from the object to acquire projection image data.

2. The method of claim 1 wherein the second radiation detector device comprises a CT scanning device.

3. The method of claim 2 wherein the first radiation detector device comprises a SPECT scanning device.

4. The method of claim 2 wherein image data obtained from the CT scanning device is converted to filtered image data and the filtered image data is converted into binary image data.

5. The method of claim 4 wherein the binary image data is compared with the original image data from the CT scanning to adjust the binary image data boundary.

6. The method of claim 1, wherein the step of determining the maximum object boundary comprises:
    filtering the image data corresponding to the plurality of images;
    summing the image data corresponding to the plurality of images; and
    processing the summed image data by applying to it a predetermined threshold value.

7. The method of claim 1 wherein the step of calculating the optimal scan trajectory includes:
    describing a sum of weighted distances from an edge image to an ellipse in a first pass unconstrained optimization of x according to the equation:

$$F(x) = \sum_{i=0}^{n-1} w_i(x)[r(x) - r_i]^2; \quad (6)$$

wherein, $$(\vec{r} - \vec{r}_i) \vec{r}\,' = 0 (i=0,1,\ldots,n-1); \quad (3)$$

$$t_i = (\vec{r} - \vec{r}_i) \times \vec{r}\,'; \quad (4)$$

$$w_i = \begin{cases} w, & t_i > 0 \\ 1, & t_i \leq 0; \end{cases} \quad (5)$$

x=($x_0$, $y_0$, a, b);
an initial value of x is described using a bounding box of the edge image wherein, $$x_0 = (\max(x_i) + \min(x_i))/2, y_0 = (\max(y_i) + \min(y_i))/2; \quad (7)$$

$$a = (\max(x_i) - \min(x_i))/2, b = (\max(y_i) - \min(y_i))/2; \text{ and,} \quad (8)$$

F is minimized; and,
describing the sum of the weighted distances from the edge image to an ellipse in a second pass constrained optimization of x according to the equation:

$$F(x) = \sum_{i=0}^{n-1} (r - r_i)^2; \quad (9)$$

wherein, $$t_i \leq 0, (i=0,1,\ldots,n-1); \text{ and,} \quad (10)$$

$$y_i = I_1(x_i), y_i < I_2(x_i); \text{ and} \quad (11)$$

$I_1$ and $I_2$ represent at least two detector heads of said first detector device.

8. The method of claim 7 wherein the first radiation detector comprises at least two detector heads disposed at a 90° angle with respect to one another.

9. The method of claim 7 wherein the first radiation detector comprises at least two detector heads disposed at a 180° angle with respect to one another.

10. The method of claim 7 wherein the first radiation detector comprises at least two detector heads disposed at a 76° angle with respect to one another.

11. The method of claim 7 wherein the trajectory comprises an arcuate portion.

12. The method of claim 7 wherein the trajectory comprises a line portion.

13. A method of optimizing a scanning trajectory of a SPECT scanning device about an object to be scanned, the method comprising:

obtaining image data corresponding to a plurality of images of the object using a CT scanning device;

determining a maximum object boundary from the CT image data;

calculating an optimal scan trajectory of the SPECT scanning device about the object based on the maximum object boundary data, wherein the optimal scan trajectory minimizes a distance between the detectors and the object to be scanned while maximizing the geometric efficiency of the detector relative to the object; and scanning the object with the SPECT scanning device along the optimal scan trajectory to detect gamma photons emanating from the object to acquire projection image data.

14. The method of claim 13 wherein the SPECT scanning device comprises at least two detectors.

15. The method of claim 14 wherein the at least two detectors are arranged at 45° angle relative to one another.

16. The method of claim 14 wherein the at least two detectors are arranged at 180° angle relative to one another.

17. The method of claim 14 wherein the at least two detectors are arranged at 76° angle relative to one another.

18. The method of claim 14, wherein the step of calculating the optimal scan trajectory includes:

describing a sum of weighted distances from an edge image to an ellipse in a first pass unconstrained optimization of x according to the equation:

$$F(x) = \sum_{i=0}^{n-1} w_i(x)[r(x) - r_i]^2; \quad (6)$$

wherein, $$(\vec{r} - \vec{r}_i)\vec{r}\,' = 0 (i=0,1,\ldots,n-1); \quad (3)$$

$$t_i = (\vec{r} - \vec{r}_i) \times \vec{r}\,'; \quad (4)$$

$$w_i = \begin{cases} w, & t_i > 0 \\ 1, & t_i \leq 0; \end{cases} \quad (5)$$

$x = (x_0, y_0, a, b)$;

n is the number of data points extracted from the edge image;

an initial value of x is described using a bounding box of the edge image wherein, $$x_0 = (\max(x_i) + \min(x_i))/2, y_0 = (\max(y_i) + \min(y_i))/2; \quad (7)$$

$$a = (\max(x_i) - \min(x_i))/2, b = (\max(y_i) - \min(y_i))/2; \text{ and,} \quad (8)$$

F is minimized; and describing the sum of the weighted distances from the edge image to an ellipse in a second pass constrained optimization of x according to the equation:

$$F(x) = \sum_{i=0}^{n-1} (r - r_i)^2; \quad (9)$$

wherein, $$t_i \leq 0, (i=0,1,\ldots,n-1); \text{ and,} \quad (10)$$

$$y_i = I_1(x_i), y_i < I_2(x_i); \text{ and} \quad (11)$$

$I_1$ and $I_2$ represent at least two detector heads of said SPECT device.

* * * * *